United States Patent [19]
Jules

[11] 3,753,080
[45] Aug. 14, 1973

[54] ELECTRIC CONTROL DEVICE FOR AN ALTERNATOR

[75] Inventor: André Jules, Sartrouville, France

[73] Assignee: Compagnie Generale D'Electricite, Paris, France

[22] Filed: Oct. 17, 1972

[21] Appl. No.: 298,221

[30] Foreign Application Priority Data
Oct. 18, 1971 France .............................. 7137339

[52] U.S. Cl. ................................ 322/28, 321/45 C
[51] Int. Cl. ........................................... A02p 11/06
[58] Field of Search ............... 322/28; 321/47, 45 C

[56] References Cited
UNITED STATES PATENTS

| | | |
|---|---|---|
| 3,323,036 | 5/1967 | Runyan .................................. 322/28 |
| 3,340,459 | 9/1967 | Fields et al. ......................... 322/28 |
| 3,370,219 | 2/1968 | Hupp .................................... 322/28 |
| 3,428,883 | 2/1969 | Gag ....................................... 322/28 |
| 3,549,982 | 12/1970 | Jules .................................... 322/28 |
| 3,562,611 | 2/1971 | Gurwicz ........................... 321/45 C X |

Primary Examiner—William M. Shoop, Jr.
Attorney—Richard C. Sughrue, Donald E. Zinn et al.

[57] ABSTRACT

An electric control device for an alternator which produces short high power pulses, comprising an electronic circuit including a capacitor, thyristors and rectifiers, the energizing power of the alternator being stored in the capacitor at the end of each pulse, the power stored in that capacitor being discharged in the energizing winding to effect the priming of the alternator for a succeeding pulse.

2 Claims, 4 Drawing Figures 3,753,080

ELECTRIC CONTROL DEVICE FOR AN ALTERNATOR

BACKGROUND OF THE INVENTION

1. Field of the Invention

The present invention concerns an electric control device for an alternator, and more particularly an electric control device for an alternator capable of supplying to a load, high power electric pulses of very short duration.

2. Description of the Prior Art

Prior art electric control devices for an alternator capable of supplying high power pulses to a low impedance load comprise a first and a second capacitor charged by an auxiliary source, means for controlling the discharge of the first capacitor in the energizing winding of the alternator to effect, before beginning of each pulse, a prior priming of the alternator, and means for controlling the discharging of the second capacitor in order to effect the cutting-off of the energizing current to the alternator at the end of each pulse.

It is observed that the electrical losses of such electric control devices are great and cause low efficiency of the alternator, which is particularly appreciable when the pulse rate is high.

The present invention aims at overcoming this disadvantage.

SUMMARY OF THE INVENTION

The present invention has for its object an electric control device for an alternator, comprising an induced winding and an inductor winding, the alternator sending out, to a load, high-power electric pulses. The device comprises a controlled rectifier bridge connected to the terminals of the induced winding, the rectifier bridge comprising at least a first thyristor. The outputs of the rectifier bridge are connected respectively to a first terminal affected by a first polarity, and to a second terminal affected by a second polarity. A first rectifier is connected between the first and second terminals, the first rectifier comprising a first electrode and a second electrode, the first electrode connected to the first terminal and the second electrode of the first rectifier then being connected to the second terminal.

A second thyristor comprising a first main electrode, a second main electrode, and an auxiliary electrode is included in the device with the first main electrode of the second thyristor being connected to the second terminal and the second main electrode of the second thyristor being connected by a third terminal to an electrode of a first capacitor. The other electrode of the capacitor is connected to the first terminal.

A third thyristor has its first main electrode connected to the first terminal and its second main electrode connected by a fourth terminal to one end of the inductor winding. The other end of the said inductor winding is connected to the second terminal.

A second rectifier has its first electrode connected to the third terminal and its second electrode connected to the fourth terminal.

A first control means controls the conduction of the first, second and third thyristors by energizing their auxiliary or gate electrodes and a second control means controls the blocking of the third thyristor.

BRIEF DESCRIPTION OF THE DRAWINGS

The present invention will be better understood from the following description given with reference to the accompanying drawing by way of illustration but having no limiting character, in which.

DESCRIPTION OF THE PREFERRED EMBODIMENT

Figure 1:
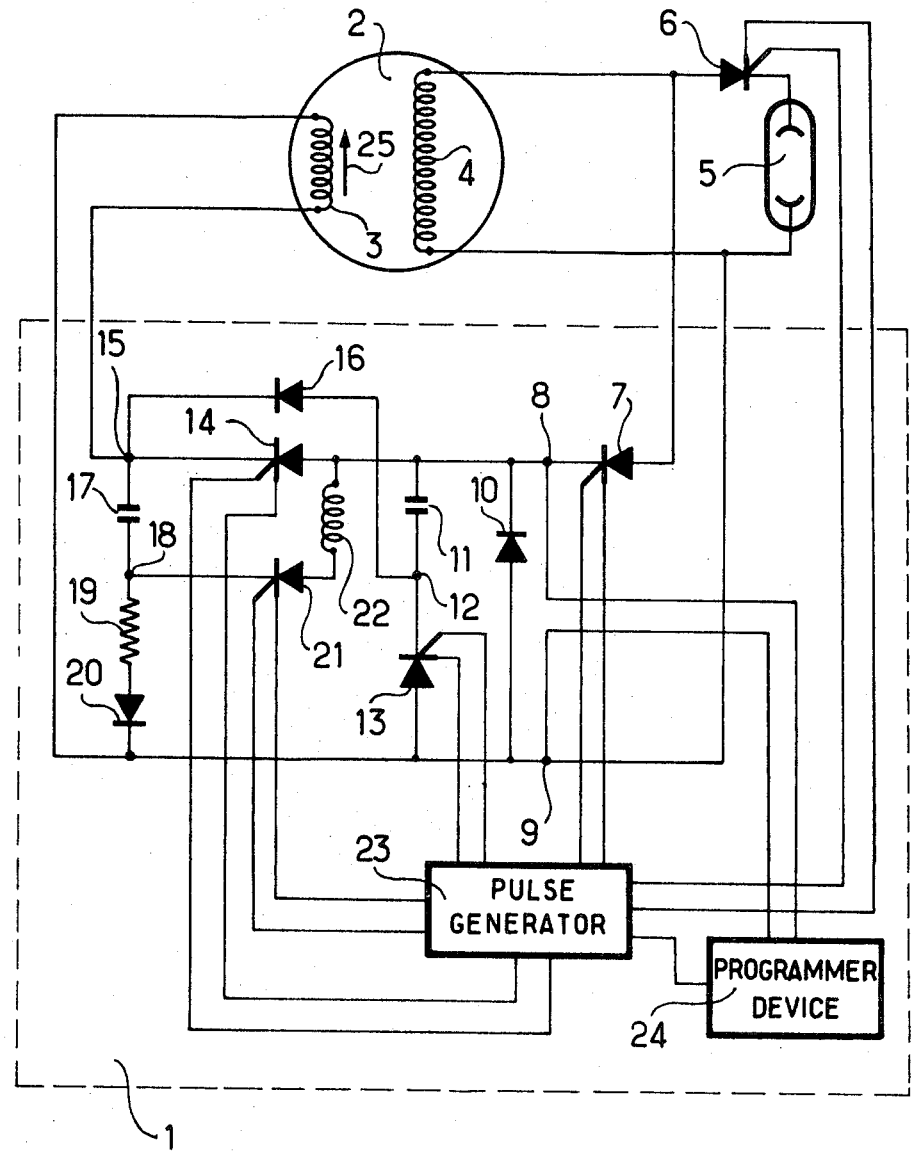
FIG. 1 represents diagrammatically an embodiment of the device according to the invention.

FIG. 1 shows an electric control device 1 for an alternator 2 comprising an exciter winding 3 and an induced winding 4. To simplify the figure, the induced winding 4 shown is of the single phase type, but it is quite evident that this induced winding 4 could be a three-phase winding, star-connected or delta-connected. The induced winding 4 is connected to a load such as an electronic flash 5, through a controlled rectifier bridge which may comprise, as shown in the figure, a thyristor 6. The electronic flash 5 may, for example, energize an active substance of a pulse laser generator, not shown.

The device 1 comprises a controlled rectifier bridge connected to the ends of the induced winding 4. The bridge comprises a thyristor 7 whose anode is connected to one end of the induced winding 4 and whose cathode is connected to a terminal 8, the other end of the induced winding 4 being connected to a terminal 9. The cathode of a rectifier 10 is connected to the terminal 8 and its anode to the terminal 9. other One electrode of a capacitor 11 is connected to the terminal 8. The other electrode of the capacitor 11 is connected by a terminal 12 to the cathode of a thyristor 13 whose anode is connected to the terminal 9. The anode of a thyristor 14 is connected to the terminal 8, its cathode being connected by a terminal 15 to one end of the inductor winding 3. The othe end of the inductor winding 3 is connected to the terminal 9. The anode of a rectifier 16 is connected to the terminal 12 and its cathode to the terminal 15.

The device 1 comprises, moreover, means for controlling the blocking of the thyristor 14. The blocking means comprises a capacitor 17 having one electrode connected to the terminal 15 and the other electrode connected to the anode of a rectifier 20 through terminal 18 and across a resistor 19. The cathode of the rectifier 20 is connected to the terminal 9. The cathode of a thyristor 21 is connected to the terminal 18, the anode of that thyristor being connected across an inductor 22 to the anode of the thyristor 14.

The device 1 also includes a control system for controlling the conduction of the thyristors 6, 7, 13, 14 and 21. The control system comprises a pulse generator 23 connected to the cathode and to the auxiliary electrode of each of the thyristors. The pulse generator 23 may be connected to a programming device 24 which is connected to the terminals 8 and 9.

The operation of the device 1 described above and shown in FIG. 1 is as follows:

The capacitor 11 is first charged by an auxiliary electric source, not shown, so that the terminal 8 is at a positive electric potential in relation to the terminal 12. The alternator 2 is driven in a rotating movement in a vacuum. The thyristors 6, 7, 13, 14 and 21 are non-conductive, no polarizing voltage being applied between their auxiliary electrode and their cathode by the pulse generator 23.

Figure 2:
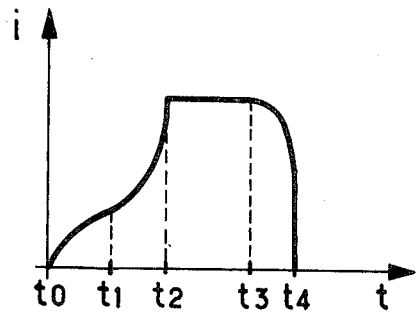
FIG. 2 is a curve representative of the variation, as a function of time, of the energizing current of an alternator connected with the device according to the invention.
Figure 3:
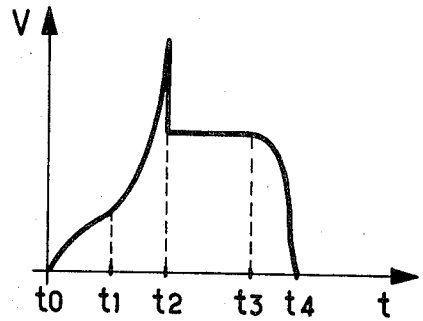
FIG. 3 is a curve representative of the variation, as a function of time, of the rectified induced voltage of the alternator.

At time $t_o$, the conduction of the thyristors 7, 13 and 14 is controlled by means of the programming device 24 and the pulse generator 23. The capacitor 11 discharges through the energizing winding 3 and into the branch comprising the capacitor 17, the resistor 19 and the rectifier 20, the resistor 19 limiting the discharge current in that branch. The current i passing through the energizing winding 3 therefore increases as shown in FIG. 2. An induced electromotive force is generated in the induced winding 4 and a rectified voltage V appears between the terminals 8 and 9 as shown in FIG. 3, the terminal 8 being positive in relation to the terminal 9.

At time $t_1$, that is, as soon as the difference in potential between the terminals 8 and 9 becomes greater than the voltage at the terminals of the capacitor 11, the thyristor 13 is blocked by a reverse voltage applied to the terminals of its main electrodes. The alternator 2 is then primed and its energizing current is thence supplied across the thyristor 7 by the action of the induced electromotive force induced in the winding 4. The energizing current and the rectified induced current continue to increase by the self-priming effect.

Figure 4:
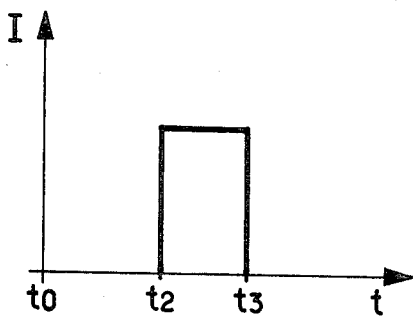
FIG. 4 is a curve representative of the variation, as a function of time, of the current supplied by the alternator in a load connected to its output terminals.

At time $t_2$, that is, when the rectified induced voltage is sufficient to cause a discharge of the electronic flash 5, conduction of the thyristor 6 is controlled by means of the programming device 24 and of the pulse generator 23. The discharge of the electronic flash 5 is primed, thus causing a voltage drop between the terminals 8 and 9, as shown in FIG. 3. The discharge current I remains substantially constant throughout the duration of the pulse, as shown in FIG. 4.

At time $t_3$, under the influence of the programming device 24 and the pulse generator 23, the energization of the auxiliary electrodes of the thyristors 6, 7, 13 and 14 is stopped, and the auxiliary electrode of the thyristor 21 is energized.

The thyristors 6 and 7 cease to be conductive at the end of the alternation of the voltage at the terminals of the induced winding 4. The end of the pulse takes place at the instant of extinguishing of the thyristor 6. The thyristor 13 is already blocked. As soon as the thyristor 21 is conductive, a reverse voltage is applied by the capacitor 17 to the main electrodes of the thyristor 14 which is blocked. The induction winding 22 limits the speed of establishing of the current which crosses the thyristor 21. The blocking of the thyristor 14 causes the cutting of the energizing current of the alternator 2. That cut generates, within the winding 3, an electromotive force which tends to oppose the reduction of the energizing current, that electromotive force tending to generate a current in the direction of the arrow 25.

That current, which corresponds to the energizing power of the alternator, therefore flows across a circuit comprising the rectifier 10, the capacitor 11 and the rectifier 16, recharging the capacitor 11. The energizing current is nil at time $t_4$.

The capacitor 11 thus recharged is therefore ready for the priming of the alternator preceding the setting up of a further pulse.

As has just been seen during the description of the operation of the device 1, the energizing power of the alternator is recuperated at the end of each pulse and stored in the capacitor 11 to insure the priming of the alternator during the following pulse. The external source of electric power charges the capacitor 11 only once during a determined series of pulses, before the first pulse.

It is therefore clear that the energy losses of the device 1 during its operation are much lower than the losses of known control devices, such as the one previously described.

The device according to the invention may be applied to alternators sending out short pulses mainly when high repeating rates are required for example, in cases of application of these alternators to electrical fishing at seas, or to the controlling of pulse operating lasers.

While the invention has been particularly shown and described with reference to the preferred embodiment thereof, it will be understood by those skilled in the art that various changes in form and details may be made therein without departing from the spirit and scope of the invention.

I claim:

1. An electric control device for an alternator, comprising an induced winding and an inductor winding, said alternator sending out, to a load, high-power electric pulses, said device comprising:
   a. controlled rectifier bridge means connected to the terminals of said induced winding, the said controlled rectifier bridge means comprising at least a first thyristor, the terminals of the said controlled rectifier bridge means being connected respectively to a first terminal of a first polarity, and to a second terminal of a second polarity;
   b. first rectifier means connected between said first and second terminals, said first rectifier means comprising a first and a second electrode wherein said first electrode is connected to said first terminal and said second electrode is connected to said second terminal;
   c. a first capacitor;
   d. second thyristor means comprising a first main electrode, a second main electrode, and an auxiliary electrode, said first main electrode being connected to said second terminal, and said second main electrode being connected to one terminal of said first capacitor, the other terminal of said first capacitor being connected to the said first terminal;
   e. third thyristor means having a first main electrode connected to said first terminal and a second main electrode connected to one end of said inductor winding, wherein the other end of said inductor winding is connected to said second terminal;
   f. second rectifier means having a first electrode connected to said one terminal of said capacitor and a second electrode connected to said second main electrode of said third thyristor means;
   g. first control means for controlling the turning on of said first, second and third thyristors by the energization of the auxiliary electrodes thereof; and h. second control means for controlling the blocking of said third thyristor, whereby energy, in said inductor winding at the completion of a high power pulse, is stored in said first capacitor means said stored energy being used for the initiation of a succeeding pulse.

2. A device according to claim 1, wherein said second control means comprises:
   a. a second capacitor having one terminal connected to said second main electrode of said third thyristor means;
   b. third rectifier means having a first elecrode connected by a resistor to the other electrode of said second capacitor, and a second electrode connected to said second terminal;
   c. an inductor; and
   d. fourth thyristor means having a first main electrode connected to said first terminal through said inductor and a second main electrode connected to said other electrode of said second capacitor, wherein said fourth thyristor means is turned on by said first control means.

* * * * *